United States Patent [19]
Hockney et al.

[11] Patent Number: 5,901,233
[45] Date of Patent: May 4, 1999

[54] NARROW BAND CONTROLLER

[75] Inventors: Richard Hockney, Lynnfield; Ralph Fenn, Cambridge, both of Mass.; Bruce Johnson, Monument, Colo.; Monique Gaffney, Goleta, Calif.

[73] Assignee: SatCon Technology Corporation, Cambridge, Mass.

[21] Appl. No.: 08/635,336

[22] Filed: Apr. 19, 1996

Related U.S. Application Data

[63] Continuation of application No. 08/262,788, Jun. 20, 1994, abandoned.

[51] Int. Cl.$^6$ .................................................. H04B 15/00
[52] U.S. Cl. ........................ 381/94.3; 381/94.2; 381/71.1; 381/71.14; 415/119
[58] Field of Search ................................. 381/94, 71, 97; 415/119

[56] References Cited

U.S. PATENT DOCUMENTS

| | | | |
|---|---|---|---|
| 4,423,289 | 12/1983 | Swinbanks | 381/71 |
| 5,170,433 | 12/1992 | Elliott et al. | 381/94 |
| 5,293,578 | 3/1994 | Nagami | 381/71 |
| 5,412,951 | 5/1995 | Wu | 62/6 |

*Primary Examiner*—Vivian Chang
*Assistant Examiner*—Xu Mei
*Attorney, Agent, or Firm*—Iandiorio & Teska

[57] ABSTRACT

A narrow band controller for suppressing disturbances from a source responsive to an input signal representative of the frequency spectrum of a disturbance from the source and providing an output signal having a similar frequency spectrum as the frequency spectrum of the input signal based on the input signal including delay logic for delaying, for a period of time, the received input signal for assuring the output signal has a phase different than the phase of said input signal.

4 Claims, 3 Drawing Sheets

NARROW BAND CONTROLLER

This is a continuation of application Ser. No. 08/262,788, filed Jun. 20, 1994, abandoned.

FIELD OF INVENTION

This invention relates to a narrow band controller and more particularly to a narrow band vibration controller for a source of vibration such as a rotating shaft or the like and an active vibration damping system incorporating such a narrow band vibration controller.

BACKGROUND OF INVENTION

Vibrations from rotating machines or the like cause unwanted noise, undue wear on moving parts, inefficiency, stress and fatigue failures, and can even present a hazard. For example, it is critical that our nation's submarines and torpedoes do not emit vibrations lest they be detected by enemy ships.

Actively damping such vibrations can be effected by a controller apparatus including a wave form generator which provides vibrations having the same frequency and amplitude but of opposed phase to that of the vibrations from the source.

Such devices, however, are fairly complicated: the amplitude, and phase characteristics of the source vibrations at each frequency must be analyzed. This analysis involves solving complicated mathematical expressions. The associated complex electrical circuitry, signal processing, and computer programming make active vibration damping difficult to accomplish in real time.

SUMMARY OF THE INVENTION

It is therefore an object of this invention to provide a narrow band controller for damping vibrations from a source.

It is a further object of this invention to provide such a narrow band controller which does not require complex signal processing thereby facilitating vibration damping in real time.

It is a further object of this invention to provide such a narrow band controller which is easier to design and implement.

It is a further object of this invention to provide such a narrow band controller which can be synchronized to the speed of the source of vibration.

It is a more general object of this invention to provide a narrow band controller.

This invention results from the realization that, to cancel unwanted disturbances generated by a source system, disturbances equal in frequency and amplitude but of the opposite phase must be applied to the source system, but that, instead of using complex signal processing involving intensive mathematical equations difficult to solve in real time, the disturbance signals received from the source, time delayed by an appropriate amount, can themselves be used to process an appropriate controller output signal which is equal in frequency and amplitude to the source generated disturbances but now of the correct phase to cancel the source generated disturbances. This invention results from the further realization that the sampling rate for sampling disturbance signals from the source can now be coupled directly to the speed of the source to generate the controller output signals at each frequency instead of evaluating the individual signals from the source each time the speed changes.

This invention features a narrow band controller for suppressing disturbances from a source comprising means for receiving an input signal representative of the frequency spectrum of a disturbance from the source, means for providing an output signal having a similar frequency spectrum, and means for delaying, for a period of time, the received input signal before it is applied to the means for providing an output signal thereby assuring the output signal has a phase different than the phase of the input signal. This cancels or at least suppresses disturbances such as vibrations emitted by the source. The means for providing an output signal may include a plurality of frequency dependent filters and there are some means for summing the output of the filters to provide an output signal for cancelling the disturbance input signal from the source. The narrow band controller further includes means for receiving a synchronization signal for synchronizing the oscillators with the received input signal from the source. The means for delaying includes a plurality of delay functions each providing a time delay based on the phase of the source frequency spectrum in each frequency to be cancelled. The delay functions may be implemented in one or more circular buffers.

If the source is a rotating shaft, the narrow band controller for suppressing vibrations according to this invention includes means for receiving an input signal representative of vibrations from the rotating shaft, means for delaying, for a period of time, the input signal for establishing a proper phase relationship to cancel the vibrations from the rotating shaft, and means for providing an output signal representative of vibrations out of phase with the vibrations of the rotating shaft. This embodiment, the synchronization signal is a signal indicative of shaft speed. This signal is coupled with the means for providing an output signal for synchronizing the means for providing an output signal with a shaft speed.

This invention also features a narrow band controller for suppressing vibrations from a source including means for receiving and sampling a vibration sensor signal having a number of frequencies for providing a digital vibration signal, means responsive to the means for receiving and sampling, for delaying the digital vibration signal at a number of frequencies and digital oscillator means, responsive to the means for delaying, for providing an output signal representative of a signal out of phase with the vibration sensor signal for damping any disturbances from the source.

This invention also features a method of suppressing disturbances from a source comprising the steps of receiving an input signal representative of the frequency spectrum of a disturbance from the source, providing an output signal having similar frequency spectrum as the frequency spectrum of the input signal, and delaying, for a period of time, the received input signal before providing the output signal for assuring the output signal has a phase different than the phase of the input signal. The step of providing an output signal includes supplying a time delayed input signal to a plurality of filters and summing the output of the filters to provide the output signal for cancelling the disturbance input signal from the source. A synchronization signal may also be received for synchronizing these filters with a synchronization signal from the source. A plurality of delay functions may be invoked for delaying the input signal and each provides a time delay based on the phase of the source frequency spectrum at each frequency to be cancelled. If the method is used for suppressing vibrations from a rotating shaft, the synchronization signal is a signal indicative of shaft speed.

Finally, this invention also features an active vibration damping system comprising means for detecting a vibration signal from a source of vibration, a controller responsive to the detecting means including means for delaying the vibration signal for a period time and means for providing an output signal based on the delayed vibration signal, the output signal having a phase different than the phase of the detected vibration signal, and means responsive to the output signal for damping any vibrations from the source.

DISCLOSURE OF PREFERRED EMBODIMENT

Other objects, features and advantages will occur to those skilled in the art from the following description of a preferred embodiment and the accompanying drawings, in which.

Figure 1:
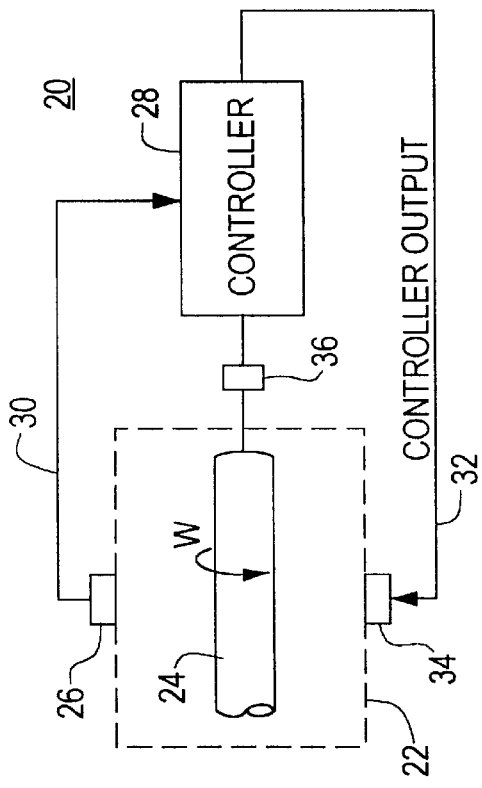
FIG. 1 is a an amplitude plot of a typical frequency spectrum generated by a source of vibrations.

Rotating shafts and the like produce vibrations having a frequency spectrum illustrated in FIG. 1. The fundamental frequency $f_0$ has one amplitude and the overtones $2f_0$, $3f_0$, $4f_0$ etc. have different amplitudes as shown.

Figure 2:
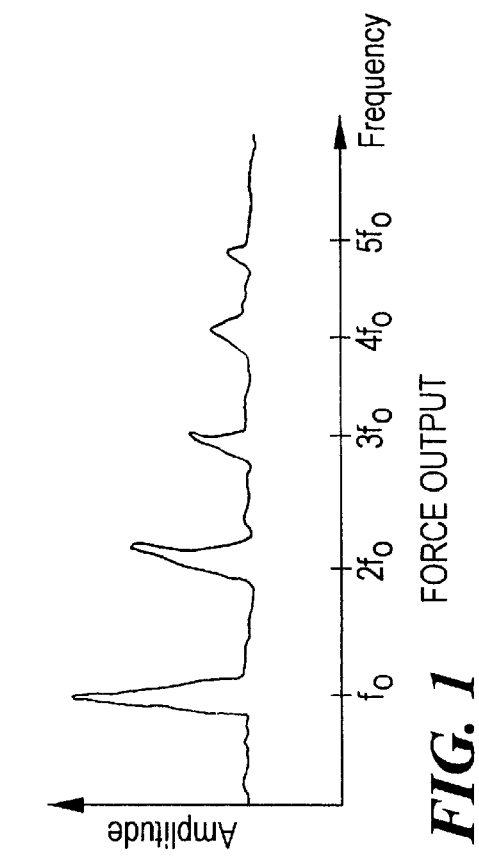
FIG. 2 is a schematic view of an active vibration damping system.

The goal in an active damping system 20, FIG. 2, is to measure the force output of the source of vibration 22, e.g. rotating shaft 24, by force measurement means 26 such as a transducer and to design controller 28 such that it analyzes the resulting signal (FIG. 1) on line 30 and provides a controller output signal on line 32 which is of the same frequency spectrum as the force signal but of opposite phase.

When the controller output signal is applied to actuator 34 or other known means for supplying vibrations to source 22, the result is a dampening of the vibrations including noise from source 24. As shaft 24 increases in speed, the frequency and amplitude spectrum may change and there may be means 36 coupled with controller 28 to account for changes in shaft speed.

Figure 3:
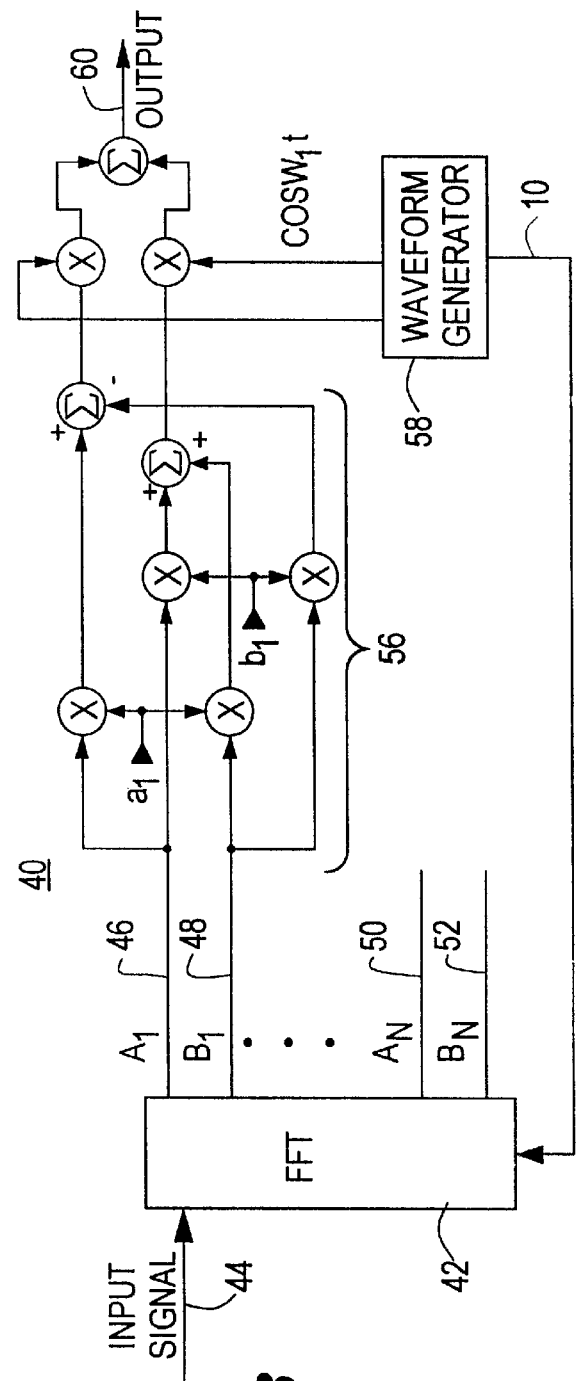
FIG. 3 is a schematic diagram of a prior art controller for the active vibration damping system of FIG. 2.

Prior art controller 40, FIG. 3 includes Fourier Transformer (FFT) 42 which receives an input vibration signal on line 44 and a sychronizing signal, typically a once per revolution sinusoid, on line 10. It outputs a number of signals on lines 46, 48, 50, 52 representing the individual frequency quadrature components of the input vibration signal on line 44. These quadrature component signals are then supplied to a matrix multiplier 56 which changes the amplitudes of each component by a predetermined amount, resulting in an effective phase and magnitude shift of the signal when remodulated. The waveform generator 58 is then used to supply quadrature modulating signals on lines 3 and 4, at the appropriate harmonic frequency, based on the synchronizing signal 10. These multiply the amplitude shifted quadrature vibration signals on lines 1 and 2 resulting in a sinusoidal signal at line 7 with the proper amplitude and phase to cancel the measured vibration harmonic. Similar signals for each harmonic are summed together giving a actuator drive signal 60. This signal is used to drive a reaction mass actuator mechanically coupled to a rotating shaft, actively damping the harmonic vibrations from the shaft.

According to this invention, however, Fourier transformers and their associated circuitry are not required. Narrow bandwidth controller 70, FIG. 4, includes means 72 such as a digital filter for providing an output signal having a similar frequency spectrum as the frequency spectrum received an as input signal on line 74 from the source. Means 72 for providing an output signal in this invention includes undamped band pass filters 82, 84, 86, 88 etc. each for outputting a signal at a distinct frequency. Then, to assure that the combined output signal will be correctly phased, time delay logic means 90 including digital delay functions 91, 92, 94, 96, etc., one for each filter as shown, delay the input signals on line 74 before delivery to filters 82, 84, 86, 88, etc., so that each signal is of the correct phase to cancel the disturbance (vibrations) from the source. The number of band pass filters and delay logic means will depend on the specific implementation, but this structure eliminates the need to modify hardware or to solve complex equations as in prior art FFT-based systems to obtain the correctly phased signal at different frequencies.

The measured analog vibration sensor signal on line 74, typically either strain, displacement, force or acceleration, is indicative of vibration from the source. The sensor signal is sampled by sampler 71 producing a digitized vibration signal. This signal is used as the input to a number of digital delays 90 individually set as described below to give the proper phase relationship of the controller output signals at each frequency relative to the sensed vibrations such that the vibrations are cancelled.

Then, the output of each of these digital delays is used as an input to lightly or undamped digital filter 72 whose center frequency is determined from a synchronization signal, such as from a signal on line 73 which synchronizes the frequency to shaft speed so that the output of the filter is synchronized with the desired vibration signal harmonic. The output of the filters are combined by summer 98 to provide a controller output signal on line 99 which is used to drive a vibration cancelling actuator or similar means for dampening vibrations.

To calculate the correct time delay, for each delay logic function 91, 92, 94, 96 etc., the phase of the source emitting vibrations is first determined using a spectrum analyzer or equivalent means known in the art. The phase of the source is based on the drive signal applied to the system and the force signal measured from the system at each frequency. Next, the phase of controller 70 at each frequency can be determined for optimal stability.

Let $\phi_{pi}$ be the phase of the source at each frequency and $\phi_{ci}$ be the phase of the vibration controller 70 for the source at each frequency. When:

$$\phi_p + \phi_c = -90° \tag{1}$$

there will be stability of the system comprising the source emitting vibrations and the controller which provides cancelling vibrations.

The time delay $t_i$ required at each frequency is then $$t_i = \phi_{ci}/w_i \tag{2}$$

where $w_i$ is the shaft speed if the source includes a rotating shaft emitting vibrations which must be dampened since phase $\phi$ is equal to (wt).

Now, if this time delay $t_i$ is applied by delay functions 91, 92, 94, 96 etc. to the force (vibration) signal from the source before the application of a controller signal on line 99 which would cancel the force acting on the source, were it at the correct phase, the controller signal will assuredly be at the correct phase for cancelling the disturbance of the source. In other words, the correct time delay ti is determined by measuring the phase difference between the signal from the source on line 74 and the signal applied by the controller.

The design of the controller according to this invention to generate signals at various cancelling frequencies includes determining the rate of sampling required of signals from the source in relation to the fundamental speed of the source. Therefore, once the delay time $t_i$ is calculated, the sampling rate at each frequency must be such that the ratio of the sampling rate to the time delay is an integer thereby turning the time delay into an integer number of sampling period delays at each frequency. In this way, a circular buffer or equivalent may be used to implement the time delay required for the correct phase control.

Figure 4:
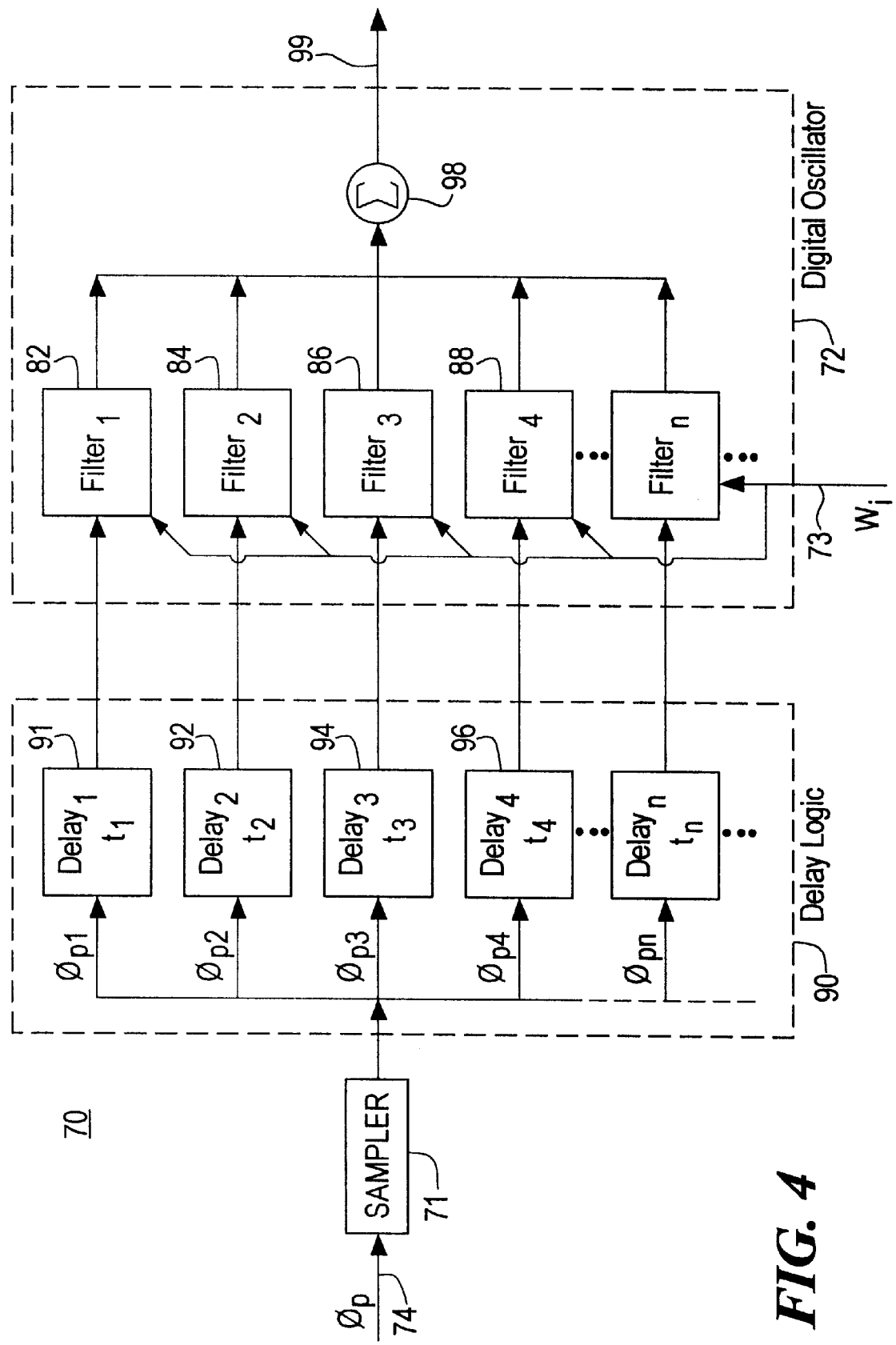
FIG. 4 is a schematic diagram of a narrow band controller according to this invention for the active vibration damping system of FIG. 2.
Figure 5:
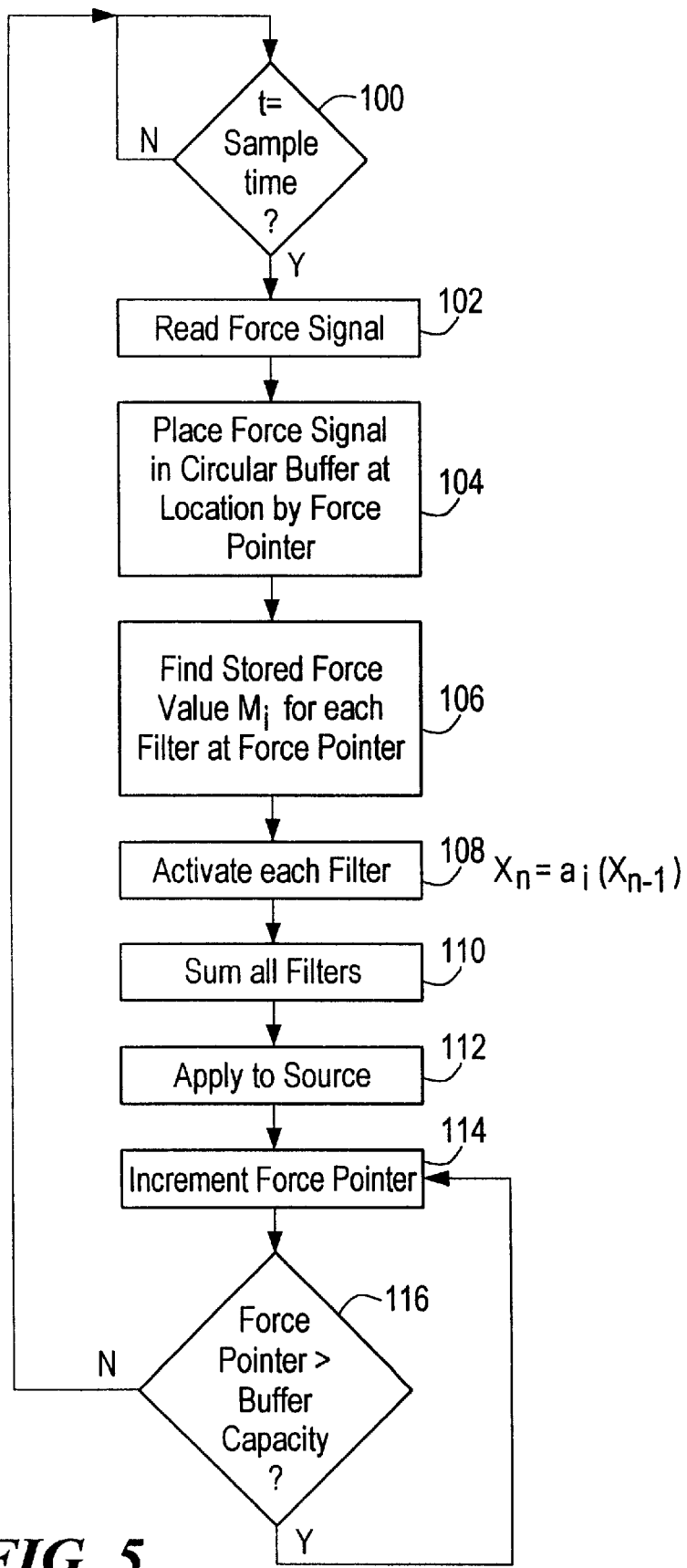
FIG. 5 is a flow diagram of the algorithm for implementing the controller of FIG. 4 according to this invention.

Once it is determined how fast to sample relative to the fundamental speed of the source, each output signal means 72, FIG. 4, is designed for a specific frequency thus:

$$X_n = a_i X_{n-1} + b_i X_{n-2} + c_i U_i \quad (3)$$

where $X_n$ is the output of the signal source; $a_i$, $b_i$, $c_i$ are constants, and $U_i$ is the time delay output from the circular buffer. In practice, the narrow band controller according to this invention operates as follows. At a set sample time, step 100, FIG. 5, the force signal is read, step 102. This signal is then placed in a circular buffer at a specified location determined by the set force pointer (discussed below), step 104.

The digital delay functions then find a stored force valve Ui (see above, equation (3) for each filter at the force pointer, step 106. Then each filter 82, 84, 86, 88, etc. FIG. 4, is activated, step 108. Summer 90, FIG. 4 is used to combine all the filter outputs, step 110, FIG. 5 and the active suppression signal is supplied to the source of the vibrations to cancel them, step 112.

Now the force pointer is incremented, step 114, and the process is ready to start again at the next sampling time, step 100. When the force pointer exceeds the buffer capacity, it is reset, step 116.

The result, regardless of the actual implementation, is a narrow band controller which eliminates the need for complex signal processing thereby facilitating vibration damping in real time and such a controller which can be easily synchronized to the speed of the source of vibrations.

Although specific features of the invention are shown in some drawings and not others, this is for convenience only as some feature may be combined with any or all of the other features in accordance with the invention.

And, other embodiments will occur to those skilled in the art and are within the following claims:

What is claimed is:

1. A system for suppressing vibrations from a shaft rotating at a speed w, the system comprising:

means for receiving an input signal from the rotating shaft representative of vibrations from the rotating shaft, said signal having a number (i) of frequencies, each frequency at a phase $\phi_{pi}$; said speed w being any positive real number and said number (i) being any positive integer;

a plurality of time delays, one for each frequency, the time delay at each frequency being fixed at $T_i = (-90 - \phi_{pi})/w_i$; and a plurality of fixed gain undamped band pass filters, one for each frequency, for generating an output signal having a phase at each frequency $\phi_{ci} = -90 - \phi_{pi}$; said phase $\phi$ being any real number from 0°–360°.

2. The system of claim 1 in which said filters have a central frequency, the controller further including means for synchronizing said center frequency.

3. The system of claim 2 in which said means for synchronizing said frequency is responsive to the speed of the rotating shaft.

4. A narrow band controller for suppressing disturbances from a source having a speed n, the controller comprising:

means for receiving an input signal representative of the frequency spectrum of a disturbance from the source;

said signal having a number of (i) frequencies, each frequency at a phase $\phi_{pi}$;

a plurality of fixed time delays for delaying said input signal at a plurality of frequencies, the time delay at each frequency being fixed at Ti=$-90 - \phi_{pi}$) ni; and a plurality of fixed gain undamped band pass filters, one for each said frequency, for generating an output signal having a phase at each frequency $\phi_{ci} = -90 - \phi_{pi}$, said phase $\phi$ being any real number from 0°–360°.

* * * * *